(12) United States Patent
Horiuchi et al.

(10) Patent No.: US 8,057,950 B2
(45) Date of Patent: Nov. 15, 2011

(54) SOLID OXIDE FUEL CELL AND METHOD OF MANUFACTURING THE SAME

(75) Inventors: Michio Horiuchi, Nagano (JP); Yasue Tokutake, Nagano (JP); Shigeaki Suganuma, Nagano (JP); Misa Watanabe, Chandler, AZ (US)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 1027 days.

(21) Appl. No.: 11/419,376

(22) Filed: May 19, 2006

(65) Prior Publication Data

US 2007/0026289 A1    Feb. 1, 2007

(30) Foreign Application Priority Data

May 20, 2005   (JP) .................. 2005-148056

(51) Int. Cl.
   *H01M 8/10*  (2006.01)
(52) U.S. Cl. ......... 429/479; 429/523; 429/429; 429/535
(58) Field of Classification Search ............ 429/12
   See application file for complete search history.

(56) References Cited

U.S. PATENT DOCUMENTS

| | | | |
|---|---|---|---|
| 4,135,040 A | | 1/1979 | Thornton |
| 5,531,019 A | * | 7/1996 | Taira et al. .......... 29/623.5 |

FOREIGN PATENT DOCUMENTS

| | | | |
|---|---|---|---|
| EP | 0615299 | | 9/1994 |
| JP | 56-160653 | | 12/1981 |
| JP | 59-114755 | * | 7/1984 |
| JP | 62-45496 | | 2/1987 |
| JP | 03095864 | | 4/1991 |
| JP | 03134963 | | 6/1991 |
| JP | 03147268 | | 6/1991 |
| JP | 04190564 | | 7/1992 |
| JP | 7-73890 | | 3/1995 |
| JP | 2695641 | | 9/1997 |
| JP | 09-320616 | | 12/1997 |
| JP | 2004-139936 | | 5/2004 |
| WO | 94/25994 | | 11/1994 |
| WO | 2005/006464 | | 1/2005 |

OTHER PUBLICATIONS

"Electrochemical Power Generation Directly from Combustion Flame of Gases, Liquids, and Solids", Michio Horiuchi et al., Reprinted from Journal of the Electrochemical Society, vol. 151, No. 9, Sep. 2004. (p. 10 of specification).

* cited by examiner

*Primary Examiner* — Ula C. Ruddock
*Assistant Examiner* — Jacob Marks
(74) *Attorney, Agent, or Firm* — Rankin, Hill & Clark LLP

(57) ABSTRACT

A solid oxide fuel cell includes: a solid electrolyte; and electrodes on both surfaces of the solid electrolyte, wherein at least one of joint surfaces where the solid electrolyte and the electrodes are in contact with each other is a roughened surface having at least two different types of surface roughness.

14 Claims, 6 Drawing Sheets

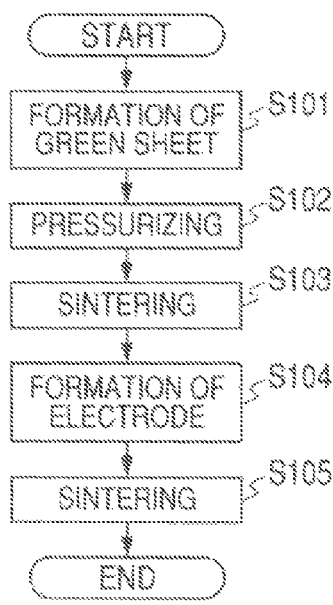
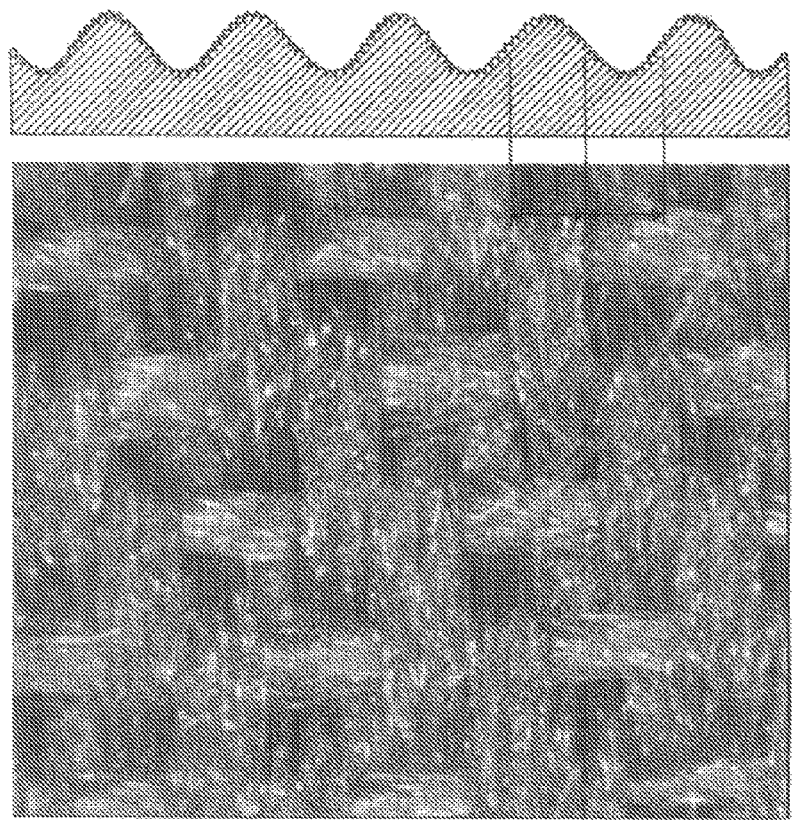

SOLID OXIDE FUEL CELL AND METHOD OF MANUFACTURING THE SAME

This application claims foreign priority based on Japanese Patent application No. 2005-148056, filed May 20, 2005, the content of which is incorporated herein by reference in its entirety.

BACKGROUND OF THE INVENTION

1. Field of the Invention

The present invention relates to a solid oxide fuel cell and a method of manufacturing the same.

2. Description of the Related Art

A solid oxide fuel cell undergoes an electrode reaction at a three-phase interface of a solid electrolyte, an electrode and a gas phase. In order to improve electric power generation performance of a fuel cell, therefore, it is necessary that the area of the interface between the solid electrolyte and the electrode, i.e., a joint surface, (which is sometimes referred to as an effective interface area) is enlarged as much as possible so as to reduce the interface resistance, whereby the electrode reaction is accelerated. The enlargement of the effective interface area between the solid electrolyte and the electrode also improves the mechanical joint strength between the solid electrolyte and the electrode.

In order to enlarge the effective interface area between the solid electrolyte and the electrode, such a method has been practiced that a surface of an electrolyte is roughened so as to form roughness on the surface (as described, for example, in JP-A-7-073890) The method for forming the roughened surface includes a coarse particle applying method, a sandpaper pressing method and a sand blasting method.

For example, such a method has been proposed that particles are applied and attached to a surface of a mother body and sintered simultaneously with the mother body so as to form a large number of convex portions on the surface of the mother body, and then an electrode is attached to the surface having the convex portions formed thereon (as described, for example, in JP-A-62-045596 and JP-A-56-160653).

Such a method has been also proposed that a roughened surface is formed by making coarse particles present only on a part of an electrode, which is in contact with a solid electrolyte, but not present on the other parts thereof, by a slurry method or a thermal spraying method (as described, for example, in Japanese Patent No. 2,695,641).

In all of the related methods for forming a roughened surface, a roughened surface cannot be obtained effectively with respect to the complicated operation or high cost of the methods. FIG. 8 is a schematic cross sectional view showing a roughened surface of a solid electrolyte formed by the related methods for forming a roughened surface. Although a roughened surface can be formed on a solid electrolyte 51, for example, by a sand blasting method, repetition frequency of roughness on the roughened surface (which is sometimes referred to as a roughness frequency) is almost constant as shown in the figure. There is a limitation in enlargement of the effective interface area by the related methods for forming a roughened surface, and therefore, improvement in electric power generation performance of a fuel cell is also limited.

SUMMARY OF THE INVENTION

The present invention has been made in view of the above circumstances, and provides a solid electrolyte fuel cell in which an area of a joint surface between a solid electrolyte and an electrode is further enlarged so as to improve electric power generation performance thereof, and a method of manufacturing the solid electrolyte fuel cell.

In some implementations, a solid oxide fuel cell of the invention comprises:
a solid electrolyte; and
electrodes on both surfaces of the solid electrolyte,
wherein at least one of joint surfaces where the solid electrolyte and the electrodes are in contact with each other is a roughened surface having at least two different types of surface roughness.

In the solid oxide fuel cell of the invention, the roughened surface may include:
a first roughened surface having a first type of the surface roughness; and
a second roughened surface having a second type of the surface roughness being formed on the first roughened surface.

In the solid oxide fuel cell of the invention, the second type of the surface roughness may be finer in roughness than the first type of the surface roughness.

In the solid oxide fuel cell of the invention, at least one of the solid electrolyte and the electrodes is generated by sintering a green sheet which is used in a green sheet sintering process and on which a pattern of the roughened surface is formed by being pressed with a pattern mold.

According to the invention, the effective interface area of the joint surface between the solid electrolyte and the electrode in a solid oxide fuel cell can be further enlarged so as to improve the electric power generation performance of the solid oxide fuel cell. The enlargement of the effective interface area between the solid electrolyte and the electrode also improves the mechanical joint strength between the solid electrolyte and the electrode. According to the invention, such a solid oxide fuel cell that has an enlarged effective interface area can be produced at low cost.

BRIEF DESCRIPTION OF THE DRAWINGS

FIG. 3 is a flow chart showing an embodiment of the method for manufacturing a solid electrolyte fuel cell according an embodiment of the invention.

FIG. 4 is an enlarged view of a surface of a twill weave material.

DESCRIPTION OF THE PREFERRED EMBODIMENTS

Figure 1:
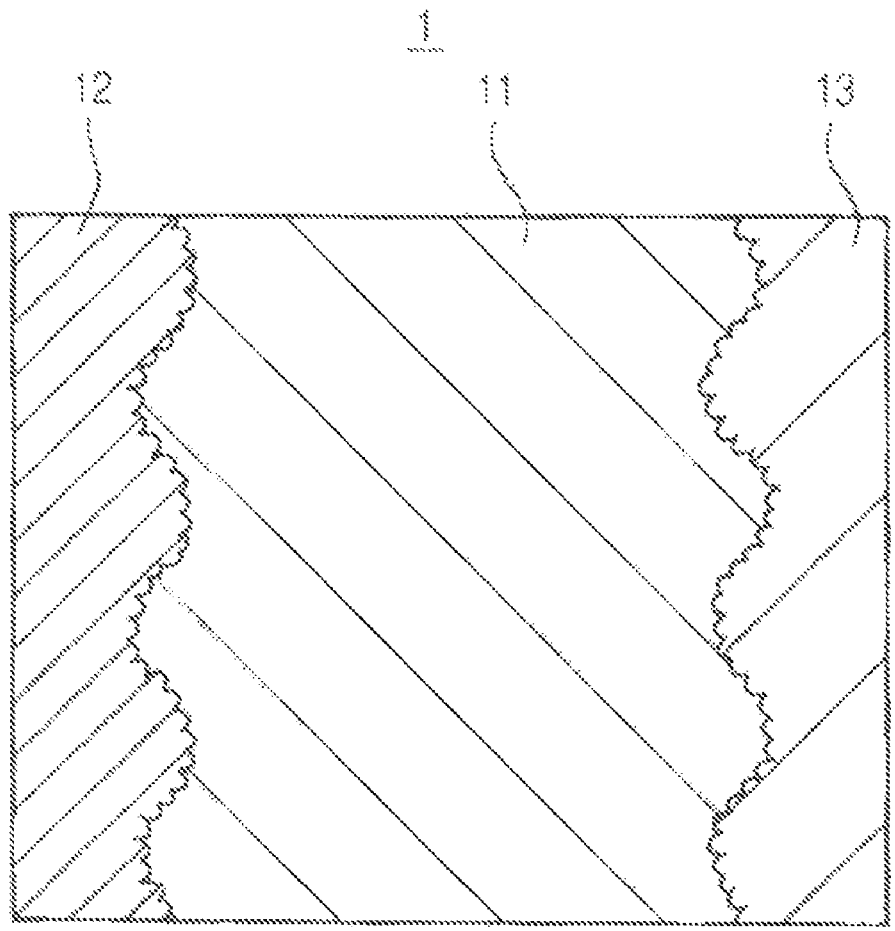
FIG. 1 is a schematic cross sectional view showing a solid oxide fuel cell according to an embodiment of the invention.
Figure 2:
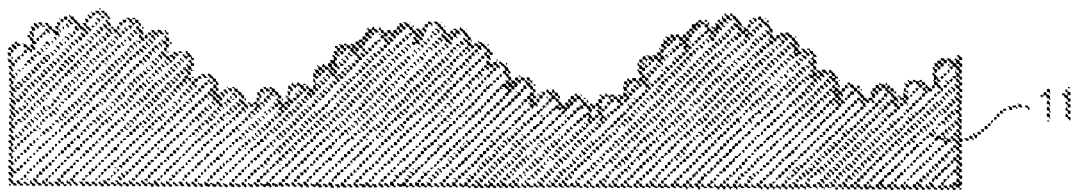
FIG. 2 is a schematic enlarged cross sectional view showing a roughened surface of the solid electrolyte of the solid oxide fuel cell shown in FIG. 1.

FIG. 1 is a schematic cross sectional view showing a solid oxide fuel cell according to an embodiment of the invention. FIG. 2 is a schematic enlarged cross sectional view showing the roughened surface of the solid electrolyte of the solid oxide fuel cell shown in FIG. 1.

According to the embodiment of the invention, in a solid oxide fuel cell 1 including a solid electrolyte 11 having electrodes 12 and 13 on both surfaces thereof, at least one of joint surfaces where the solid electrolyte 11 and the electrodes 12 and 13 are in contact with each other, is a roughened surface having at least two surface roughnesses that are different from each other. In the embodiment shown in FIG. 1, roughened surfaces are formed on both surfaces of the solid electrolyte 11.

As the roughened surfaces having at least two surface roughnesses different from each other on the joint surfaces between the solid electrolyte 11 and the electrodes 12 and 13 in the embodiment, such a roughened surface is formed that is a roughened surface having a first surface roughness, on which a roughened surface having a second surface roughness is formed. In this case, the second surface roughness is finer than the first surface roughness. In other words, the joint surfaces between the solid electrolyte 11 and the electrodes 12 and 13 each has a roughness structure having at least two roughness frequencies different from each other, and the roughness structure has a first roughness structure having a relatively large roughness frequency and a second roughness structure having a relatively small roughness frequency formed on the first roughness structure.

The solid electrolyte 11 in the embodiment is generated with a green sheet used in the green sheet sintering method by sintering the green sheet having the roughened surface formed by pressing a pattern mold thereon.

The pattern mold has a roughened surface being a mold of the roughened surface to be formed on the green sheet. The roughened surface on the pattern mold has a roughened surface having a first surface roughness, on which a roughened surface having a second surface roughness is formed, and the second surface roughness is finer than the first surface roughness. In other words, the pattern mold has a roughness structure having at least two roughness frequencies different from each other corresponding to the roughness structure to be formed on the green sheet, and the roughness structure on the pattern mold has a first roughness structure having a relatively large roughness frequency and a second roughness structure having a relatively small roughness frequency formed on the first roughness structure. The pattern mold having a roughened surface having the first surface roughness, on which a roughened surface having the second surface roughness is formed, is formed of a fabric material woven with inorganic fibers, organic fibers or thin metal wires, or a metallic member having a surface shape transferred from a fabric material woven with inorganic fibers, organic fibers or thin metal wires.

The method of manufacturing a solid oxide fuel cell according to an embodiment of the invention roughly includes two process steps: a transferring step of transferring a roughened surface of a pattern mold onto at least one surface of a green sheet used in a green sheet sintering method by pressing the pattern mold onto the surface of the green sheet; and a sintering step of sintering the green sheet having the roughened surface formed in the preceding transferring step to form the solid electrolyte or the electrode. A specific example of the method will be described in detail. FIG. 3 is a flowchart showing an embodiment of the method of manufacturing a solid electrolyte fuel cell according an embodiment of the invention. In this embodiment, an electrolyte-supported fuel cell is manufactured for example.

In step S101, ethanol, dibutyl phthalate and polyvinyl butyral are added to SDC (samaria-doped ceria) powder, and a green sheet is formed by a ball mill method.

In step S102, the green sheet generated in step S101 is punched out, for example, to a square of 140 cm, and a fabric (such as a fabric material of organic fibers), which is a pattern mold for forming a roughened surface on the green sheet, is pressed onto both surfaces of the green sheet. The assembly of the fabric, the green sheet and the fabric accumulated in this order is applied with a pressure, for example, of 150 kg/cm$^2$ at a room temperature for 5 minutes by holding with metallic flat plates from both sides of the assembly. According to the operation, the shape of the roughened surface of the fabric as the pattern mold is transferred to the green sheet.

In step S103, the green sheet having the roughened surface formed is punched out to a circular shape and sintered in the air, for example, at 1,300° C. for 5 hours, so as to obtain an SDC disk.

In step S104, a NiO-SDC anode paste is coated on one surface of the SDC disk, and an SSC ($Sm_{0.5}Sr_{0.5}CoO_3$)-SDC cathode paste is coated on the other surface thereof. Platinum meshes are embedded in the pastes. The platinum meshes are embedded in the electrodes for strengthening the electrodes and collecting electric power. Platinum wires are connected to the platinum meshes, respectively, for example, by welding, so as to provide electric connections to external circuits.

In step S105, the anode paste and the cathode paste are sintered in the air, for example, at 1,200° C. for 1 hour.

The solid oxide fuel cell including an SDC disk having a diameter of about 15 cm and electrodes formed thereon according to the embodiment of the invention having been thus completed by the aforementioned procedures, is subjected to an electric power generation test by making a butane-air premixed flame in direct contact with the anode surface of the cell. As a result, an electric power output density of about 140 mW/cm$^2$ is obtained. For comparison, a related solid oxide fuel cell generated in the same procedures, except that a roughened surface is formed by a sandpaper method, is subjected to the same electric power generation test, and as a result, an electric power output density of about 100 mW/cm$^2$ is obtained. Accordingly, it has been experimentally confirmed that the solid oxide fuel cell of the invention offers improved electric power generation performance.

The solid oxide fuel cell according to the embodiment of the invention may be applied in general types of fuel cells. For example, in the above electric power generation test, the solid oxide fuel cell according to the embodiment of the invention is applied to a power generation system utilizing a combustion flame.

Figure 7:
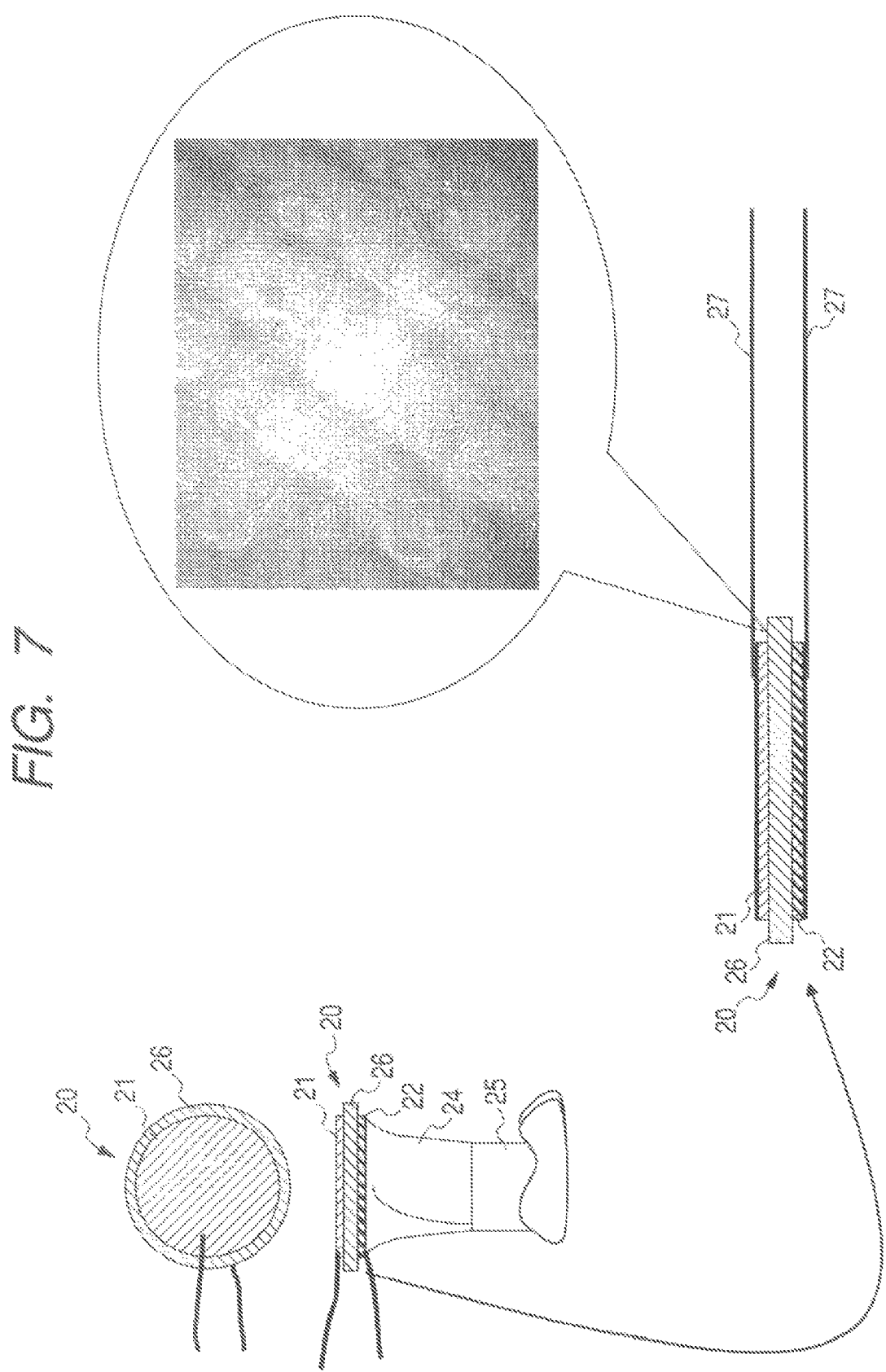
FIG. 7 is a diagram showing a solid oxide fuel cell fueled with flames.
Figure 8:
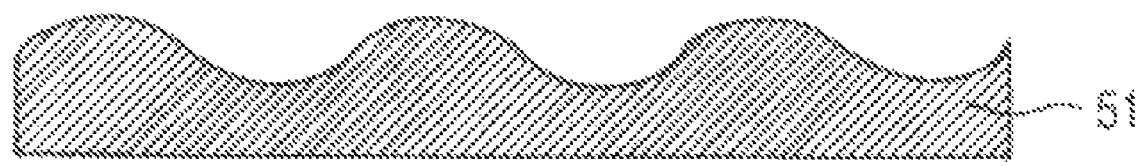
FIG. 8 is a schematic cross sectional view showing a roughened surface of a solid electrolyte formed by the related methods for forming a roughened surface.

FIG. 7 is a diagram showing the solid oxide fuel cell fueled with flames. On surfaces of a SDC disc 20 which is supported by platinum wires 27, a cathode 21 and an anode 22 both including the platinum meshes are formed. The anode 22 is exposed directly to a flame 24 which is emitted from a burner nozzle 25. This configuration is described in JP-A-2004-139936 and "Electrochemical Power Generation Directly from Combustion Flame of Gases, Liquids, and Solids", Michio Horiuchi, Shigeaki Suganuma, and Misa Watanabe, Journal of the Electrochemical Society, Vol. 151, No. 9, September 2004. In applying the solid oxide fuel cell of the embodiment of the invention to this configuration, an electrolyte 26 provided on the SDC disc 20 has the roughened surface formed with at least two different surface roughnesses as described above.

In the case where the method of the embodiment of the invention is applied to manufacturing of an electrode-supported fuel cell, an electrode mother body is produced with a green sheet and subjected to the aforementioned procedures.

Specific examples of the cases where the pattern mold used for forming a roughened surface on a green sheet is a fiber fabric material or a metallic fabric material will be described below.

Examples of the organic fiber material include acrylic fibers (polyacrylonitrile), cotton, silk, acetate fibers, Rayon, Tetron, polyester fibers, Vinylon, etc., and blended yarn thereof, etc. Examples of the inorganic fiber material include carbon, alumina, silica, boron, etc. Preferred examples of the metallic fiber material include SUS 304, 304L, 310S, 316, 316L, 321, 347, 410, 430, etc., and copper and nickel, etc., are also included. There is such an advantage in the case where the pattern mold is a fabric material of organic fibers that even when an organic fabric material cannot be released from a green sheet after pressing the organic fabric material onto the green sheet to form the roughened surface, the organic fabric material can be burnt out in the subsequent sintering step.

Examples of the texture of the fabric material include plain weave, twill weave, basket weave and sateen weave. Plain weave and twill weave are advantageous in cost. In the case where the pattern mold is formed of metallic fibers, it is advantageous in cost and repeated use, and examples of the texture thereof include plain weave, plain tatami mat weave, twill weave, twilled tatami mat weave, straw mat weave, crimped weave, lock crimped weave, flat-top weave, ton-cap weave, ty-rod weave, leno weave, rhombus weave, round weave, herringbone weave, wire conveyor net, hexagonal weave and the like. In consideration of cost and formation of fine roughness, plane tatami mat weave, twill weave and twilled tatami mat weave are preferred. FIG. 4 is an enlarged view of a surface of a twill weave material for example. "Waviness" appears on the fabric material functions as a roughness structure having a larger roughness frequency, and strands constituting the fabric function as a roughness structure having a smaller roughness frequency. The thin fibers constituting the strands function as a roughness structure having a further smaller roughness frequency.

The pattern mold used for forming a roughened surface on a green sheet may be a metallic member having a surface shape transferred from the fabric material woven with inorganic fibers, organic fibers or thin metal wires. In other words, the surface shape of the fabric material is modeled with a metallic member in advance, and the metallic member is used as the pattern mold for forming a roughened surface on a green sheet. The pattern mold formed of a metallic member is advantageous since it can be repeatedly used.

One example of the relationship between the weaving density of the fabric material as the pattern mold for forming a roughened surface on a green sheet and the raw material powder of the green sheet for forming the solid electrolyte is explained below.

The intermediate particle diameter of the raw material powder of the solid electrolyte is preferably, for example, about from 0.5 to 10 μm. The fiber diameter is preferably about 0.5 μm or more while those having a diameter of about 0.1 μm are commercially available. The strand is preferably a twisted strand, and the diameter thereof is preferably about from 5 to 100 μm. A strand having a diameter of less than 5 μm is not preferred since it brings about increased cost and is poor in formation of a roughened surface. A strand having a diameter exceeding half of the thickness of the green sheet is not preferred. For example, a strand having a diameter exceeding 100 μm is not preferred for processing a green sheet having a thickness of about 200 μm. A higher weaving density within the aforementioned range is preferred for forming a roughened surface having fine roughness, and it is practically preferred that the designed values are determined in consideration of balance between cost and effect. In general, the pattern mold preferably has such a shape that forms an impression of strands or fibers over the entire surface where a roughened surface is to be formed.

Figure 5:
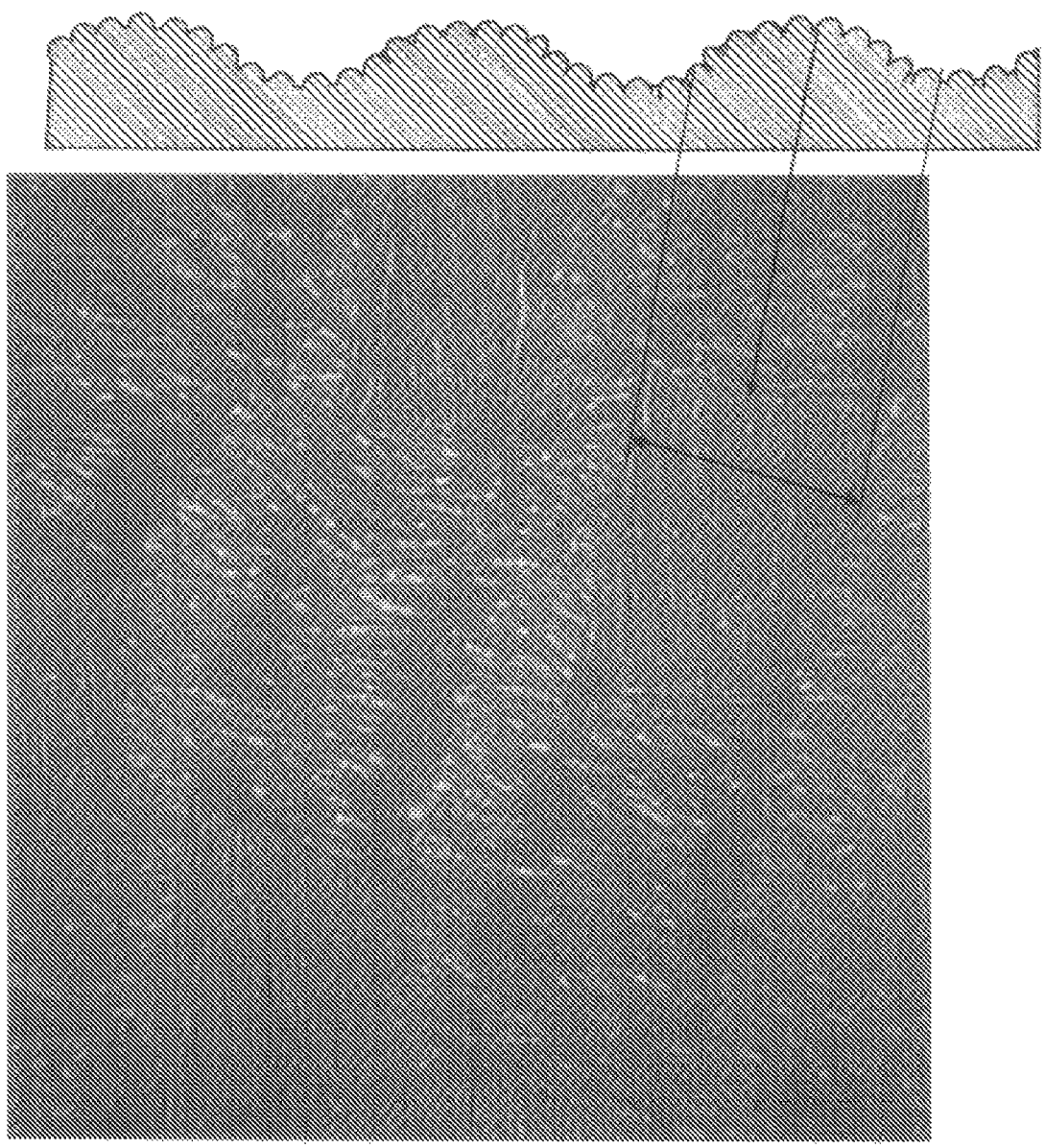
FIG. 5 is a micrograph showing a surface of a sintered body of a green sheet having been formed with a roughened surface according to the embodiment of the invention.
Figure 6:
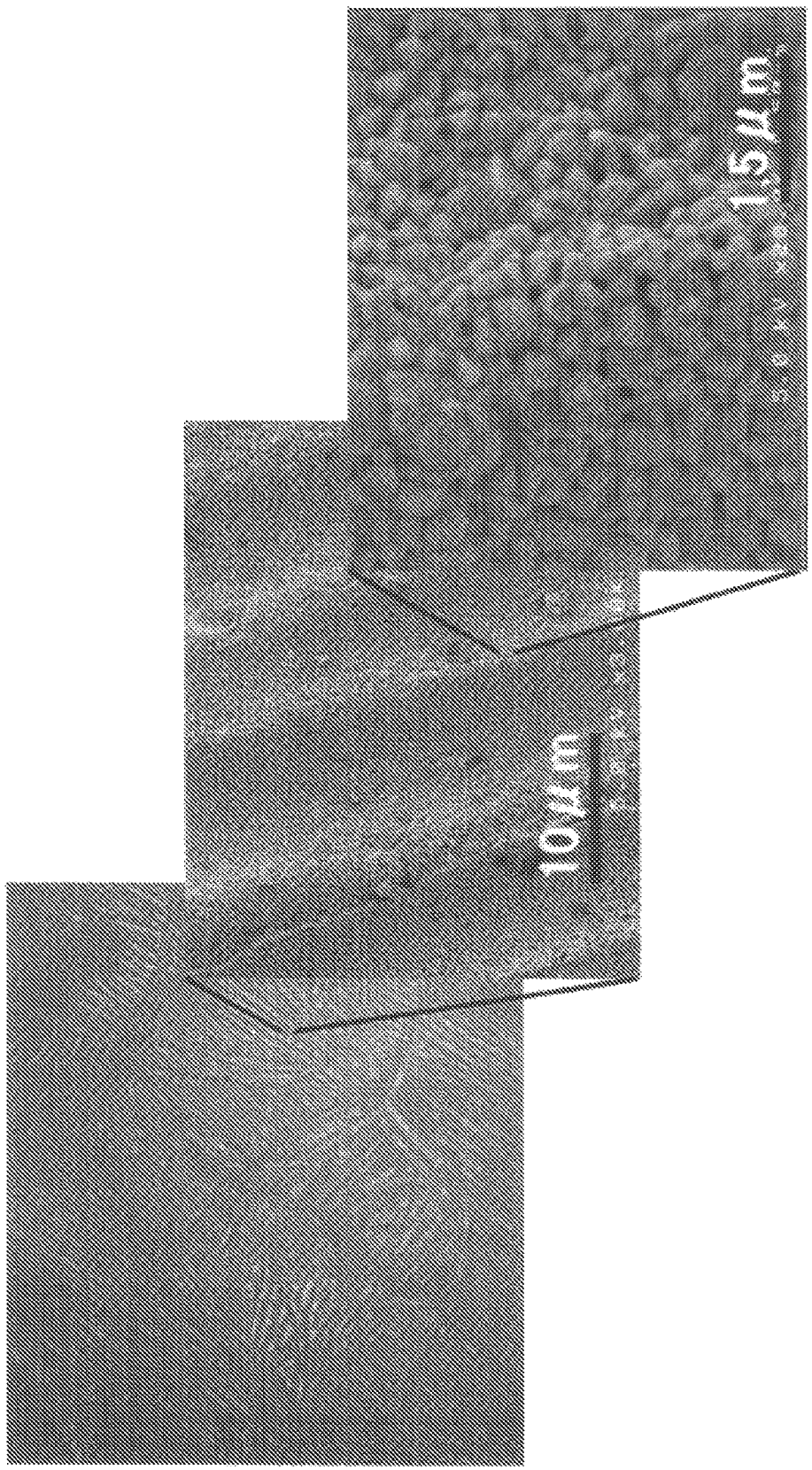
FIG. 6 is an enlarged view of FIG. 5.

FIG. 5 is a micrograph showing a surface of a sintered body of a green sheet having been formed with a roughened surface according to the embodiment of the invention. FIG. 6 is an enlarged view of FIG. 5. It can be confirmed from the figures that on the roughness structure having a relatively large roughness frequency shown in FIG. 5, the roughness structures having a relatively smaller roughness frequency and a further smaller roughness frequency are formed as shown in FIG. 6. It is thus confirmed that such a roughened surface is formed in the embodiment that has plural surface roughnesses different from each other. The roughness structure having a larger roughness frequency shown in FIG. 5 corresponds to the waviness appeared on the fabric material. The roughness structure having a smaller roughness frequency shown in FIG. 6 corresponds to the strands constituting the fabric, and the roughness structure having a further smaller roughness frequency shown in FIG. 6 corresponds to the thin fibers constituting the strands.

In the aforementioned embodiment, the joint surface between the solid electrolyte and the electrode has a roughened surface having two or three surface roughnesses different from each other, i.e., a roughened surface having a roughness structure with two or three roughness frequencies different from each other, but a roughened surface having four or more surface roughnesses may be used in the invention.

The invention can be applied to a solid oxide fuel cell including a solid electrolyte having electrodes on both surfaces thereof. According to the invention, the effective interface area between the solid electrolyte and the electrode can be further enlarged as compared to the related products, whereby the electric power generation performance of the solid oxide fuel cell can be improved. The enlargement of the effective interface area between the solid electrolyte and the electrode also improves the mechanical joint strength between the solid electrolyte and the electrode. According to the invention, furthermore, the solid oxide fuel cell having an enlarged effective interface area can be produced at low cost.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A solid oxide fuel cell comprising:
    a solid electrolyte; and
    electrodes on both surfaces of the solid electrolyte,
    wherein at least one joint surface where the solid electrolyte and the electrodes contact each other is a roughened surface having a first roughened surface with a first surface roughness and a second roughened surface with a second surface roughness,
    wherein the first roughened surface has a first roughness frequency corresponding to a waviness appearing on a weave of strands and the second roughened surface has a second roughness frequency corresponding to thin fibers constituting the weave of strands, and
    wherein the second surface roughness is finer than the first surface roughness and is formed on the first roughened surface.

2. The solid oxide fuel cell as claimed in claim 1, wherein at least one of the solid electrolyte and the electrodes is generated by sintering a green sheet which is used in a green sheet sintering process and wherein a pattern mold presses a pattern of the roughened surface on the green sheet.

3. The solid oxide fuel cell as claimed in claim 2, wherein the pattern mold has a pattern mold roughened surface to be a mold of the pattern of the roughened surface that is to be formed on the green sheet.

4. The solid oxide fuel cell as claimed in claim 3, wherein the pattern mold roughened surface includes: a first roughened surface having the first surface roughness; and a second roughened surface having the second surface roughness and being formed on the first roughened surface.

5. The solid oxide fuel cell as claimed in claim 2, wherein the pattern mold includes a fabric material that is woven with inorganic fibers, organic fibers or thin metal wires.

6. The solid oxide fuel cell as claimed in claim 2, wherein the pattern mold includes a metallic member on which a surface shape of a fabric material that is woven with inorganic fibers, organic fibers or thin metal wires is transferred.

7. A method of manufacturing a solid oxide fuel cell including a solid electrolyte having electrodes on both surfaces thereof comprising the steps of:

forming a roughened surface at a joint surface where the solid electrolyte and the electrodes contact each other, the roughened surface having at least two different types of surface roughness, wherein the roughened surface is formed with a pattern mold, and wherein the pattern mold has a pattern mold roughness structure having a first roughness structure and a second roughness structure whereby the second roughness structure is formed on the first roughness structure and the first roughness structure is substantially different than the second roughness structure, and wherein the first roughness structure is formed by waviness appearing on a weave of strands and the second roughness structure is formed by thin fibers constituting the weave of strands.

8. The method of manufacturing the solid oxide fuel as claimed in claim 7, wherein the roughened surface includes a first roughened surface having a first surface roughness and a second roughened surface having a second surface roughness formed on the first roughened surface.

9. The method of manufacturing the solid oxide fuel as claimed in claim 8, wherein the second surface roughness is finer in roughness than the first surface roughness.

10. The method of manufacturing the solid oxide fuel as claimed in claim 7 further comprising the steps of:

pressing a pattern mold on a green sheet used in a green sheet sintering process;

forming a pattern of the roughened surface on the green sheet; and generating at least one of the solid electrolyte and the electrodes by sintering the green sheet.

11. The method of manufacturing the solid oxide fuel as claimed in claim 10, wherein the pattern mold roughness structure is a mold of the pattern of the roughened surface formed on the green sheet.

12. The method of manufacturing the solid oxide fuel as claimed in claim 7, wherein the second roughness structure is finer in roughness than the first roughness structure.

13. The method of manufacturing the solid oxide fuel as claimed in claim 10, wherein the pattern mold includes a fabric material that is woven with inorganic fibers, organic fibers or thin metal wires.

14. The method of manufacturing the solid oxide fuel as claimed in claim 10, wherein the pattern mold includes a metallic member on which a surface shape of a fabric material that is woven with inorganic fibers, organic fibers or thin metal wires is transferred.

\* \* \* \* \*